United States Patent
Jayanth et al.

(10) Patent No.: US 9,892,150 B2
(45) Date of Patent: Feb. 13, 2018

(54) UNIFIED DATA MANAGEMENT FOR DATABASE SYSTEMS

(71) Applicant: SAP SE, Walldorf (DE)

(72) Inventors: Jayanth Jayanth, Heidelberg (DE); Dastagiri Reddy, Heidelberg (DE); Reghu Ram Thanumalayan, Walldorf (DE)

(73) Assignee: SAP SE, Walldorf (DE)

( * ) Notice: Subject to any disclaimer, the term of this patent is extended or adjusted under 35 U.S.C. 154(b) by 350 days.

(21) Appl. No.: 14/816,805

(22) Filed: Aug. 3, 2015

(65) Prior Publication Data

US 2017/0039232 A1 Feb. 9, 2017

(51) Int. Cl.
*G06F 17/30* (2006.01)

(52) U.S. Cl.
CPC .. *G06F 17/30345* (2013.01); *G06F 17/30516* (2013.01); *G06F 17/30584* (2013.01)

(58) Field of Classification Search
CPC ......... G06F 17/30345; G06F 17/30516; G06F 17/30584
USPC ...................................................... 707/609
See application file for complete search history.

(56) References Cited

U.S. PATENT DOCUMENTS

| | | | |
|---|---|---|---|
| 7,580,941 B2 | 8/2009 | Narasayya et al. | |
| 9,411,853 B1* | 8/2016 | Dovrtel | G06F 17/30477 |
| 9,606,921 B2* | 3/2017 | Kamp | G06F 12/0815 |
| 9,710,507 B2* | 7/2017 | Bendel | G06F 17/30339 |
| 9,792,312 B2* | 10/2017 | Benkstein | G06F 17/30551 |
| 9,798,794 B2* | 10/2017 | Hase | G06F 17/30592 |
| 2006/0069876 A1 | 3/2006 | Bansal et al. | |
| 2007/0271211 A1* | 11/2007 | Butcher | G06F 17/30339 707/999.001 |
| 2009/0106198 A1* | 4/2009 | Srinivasan | G06F 17/30489 707/999.003 |
| 2010/0235335 A1* | 9/2010 | Heman | G06F 17/30345 707/703 |
| 2011/0138148 A1 | 6/2011 | Friedman et al. | |
| 2012/0179809 A1* | 7/2012 | Barsness | G06F 17/30516 709/224 |
| 2014/0279963 A1 | 9/2014 | Schreter et al. | |
| 2014/0281212 A1 | 9/2014 | Schreter et al. | |
| 2014/0365424 A1 | 12/2014 | Herbst et al. | |

OTHER PUBLICATIONS

Megiddo, N., Modha, D.S.: Outperforming LRU with an Adaptive Replacement Cache Algorithm. Computer, IEEE Computer Society, Apr. 2004, pp. 4-11.

(Continued)

*Primary Examiner* — Pavan Mamillapalli
(74) *Attorney, Agent, or Firm* — Braker Hughes Bellermann LLP

(57) ABSTRACT

A database architecture includes at least an in-memory database and a disk-based database (also referred to as "hot" and "warm" data stores). In the database architecture, data can be partitioned (and re-partitioned) and/or moved within and among the in-memory and disk-based databases, based on query access patterns derived from received database queries. The partitions and inter-database movements can be based at least in part on clustered, dynamic data units that are defined using shared individual attribute values of data records, and updated based on the received queries.

20 Claims, 9 Drawing Sheets

(56) References Cited

OTHER PUBLICATIONS

Jindal, A., Dittrich, J: Relax and let the database do the partitioning online. Information Systems Group, Saarland University, pp. 1-27, Springer (2012).
Megiddo, N., Modha, D.S.: Arc: A self-tuning, low overhead replacement cache. In: FAST. vol. 3, pp. 115-130 (2003).
Navathe, S., Ceri, S., Wiederhold, G., Dau, J.: Vertical partitioning al-gorithms for database design. ACM Transactions on Database Systems (TODS) 9(4), 680-710 (1984).

* cited by examiner

|     | Product Class ($c_1$) | Product Category ($c_2$) | Company ($c_3$) |
| --- | --- | --- | --- |
| 726 | I | Soap | ABC |
| 728 | I | Soap | DEF |
| 730 | I | Soap | GHI |
| 732 | I | Shampoo | ABC |
| 734 | I | Shampoo | DEF |
| 736 | II | Soap | ABC |
| 738 | II | Soap | DEF |
| 740 | II | Soap | GHI |
| 742 | II | Shampoo | ABC |
| 744 | II | Shampoo | DEF |

FIG.7B

UNIFIED DATA MANAGEMENT FOR DATABASE SYSTEMS

TECHNICAL FIELD

This description relates to data management for databases.

BACKGROUND

The use of databases and related database access techniques enable the storage and use of vast amounts of data. However, it is often difficult for users to locate, utilize, or modify data in a desired manner, particularly when the total amount of data being stored is very large, or when the user is faced with time and/or cost constraints when accessing the data.

SUMMARY

Described techniques provide for the use of a database architecture including at least an in-memory database and a disk-based database (also referred to as "hot" and "warm" data stores). In the database architecture, data can be partitioned (and re-partitioned) and/or moved within and among the in-memory and disk-based databases, based on query access patterns derived from received database queries. The partitions and inter-database movements can be based at least in part on clustered, dynamic data units that are defined using shared individual attribute values of data records, and updated based on the received queries.

According to one general aspect, a computer program product is tangibly embodied on a non-transitory computer-readable storage medium and comprises instructions that, when executed, are configured to cause at least one computing device to receive a stream of queries to be applied against data in a columnar-store database in which hot data is stored in an in-memory database for preferred access relative to warm data stored in a disk-based database. The instructions, when executed, are further configured to track usage counts for columns of the columnar-store database, reflecting usage thereof by individual queries of the stream of queries, select column sets, each column set including at least one column of the columnar-store database, and calculate, for each column set, at least one record count of data records that include a column value, and at least one distinct count of distinct column values within each column set. The instructions, when executed, are further configured to generate at least one dynamic data unit from the column sets, based on the usage counts, the at least one record count, and the at least one distinct count, the at least one dynamic data unit including a set of data records sharing at least one common column value, and then analyze partitions of the data, based on the at least one dynamic data unit, to thereby obtain updated partitions, identify updated hot data and updated warm data within the updated partitions, based on the at least one dynamic data unit, and execute a data swap of data units from the partitions to the updated partitions, using the at least one dynamic data unit, to thereby have the updated hot data positioned within the in-memory database and the updated warm data within the disk-based database.

According to another general aspect, a computer-implemented method for executing instructions stored on a non-transitory computer readable storage medium includes receiving a stream of queries to be applied against data in a columnar-store database in which hot data is stored in an in-memory database for preferred access relative to warm data stored in a disk-based database. The method further includes identifying a dynamic data unit generation trigger from the stream of queries, identifying sets of columns of the columnar-store database, and identifying, for each column set of the sets of columns, at least one record count of data records including a column value, and at least one distinct count of distinct column values. The method further includes calculating a relative probability distribution distance for each column set of the sets of columns, based on the at least one record count and the at least one distinct count, generating at least one dynamic data unit from at least one column set of the sets of columns, based on the at least one record count, the at least one distinct count, and the relative probability distribution distances, and partitioning the data, and identifying updated hot data and updated warm data therein, based on the at least one dynamic data unit.

According to another general aspect, a system includes instructions recorded on a non-transitory computer-readable storage medium, and executable by at least one processor. The system includes a query window monitor configured to cause the at least one processor to count queries of a stream of queries to be applied against data in a columnar-store database in which hot data is stored in an in-memory database for preferred access relative to warm data stored in a disk-based database, wherein the in-memory database includes a main memory and a disk-based memory configured to store the hot data, and wherein the query window monitor is further configured to count the queries relative to at least one sliding query window, and to count the at least one query window relative to a query workload. The system also includes a data unit generator configured to cause the at least one processor to generate, in response to the at least one query window being full, at least one dynamic data unit including a set of data records sharing at least one common column value for a corresponding column set. The system also includes a partition analyzer configured to cause the at least one processor, in response to a determination that the query workload is full, to analyze partitions of the data defined in terms of the data unit, to thereby obtain updated partitions, a temperature selector configured to cause the at least one processor to identify updated hot data and updated warm data within the updated partitions, and a data unit swapper configured to cause the at least one processor to execute a data swap of data units from the partitions to the updated partitions.

The details of one or more implementations are set forth in the accompanying drawings and the description below. Other features will be apparent from the description and drawings, and from the claims.

BRIEF DESCRIPTION OF THE DRAWINGS

FIG. 7B is an example database table used to explain operations of the flowchart of FIG. 7A.

DETAILED DESCRIPTION

Figure 1:
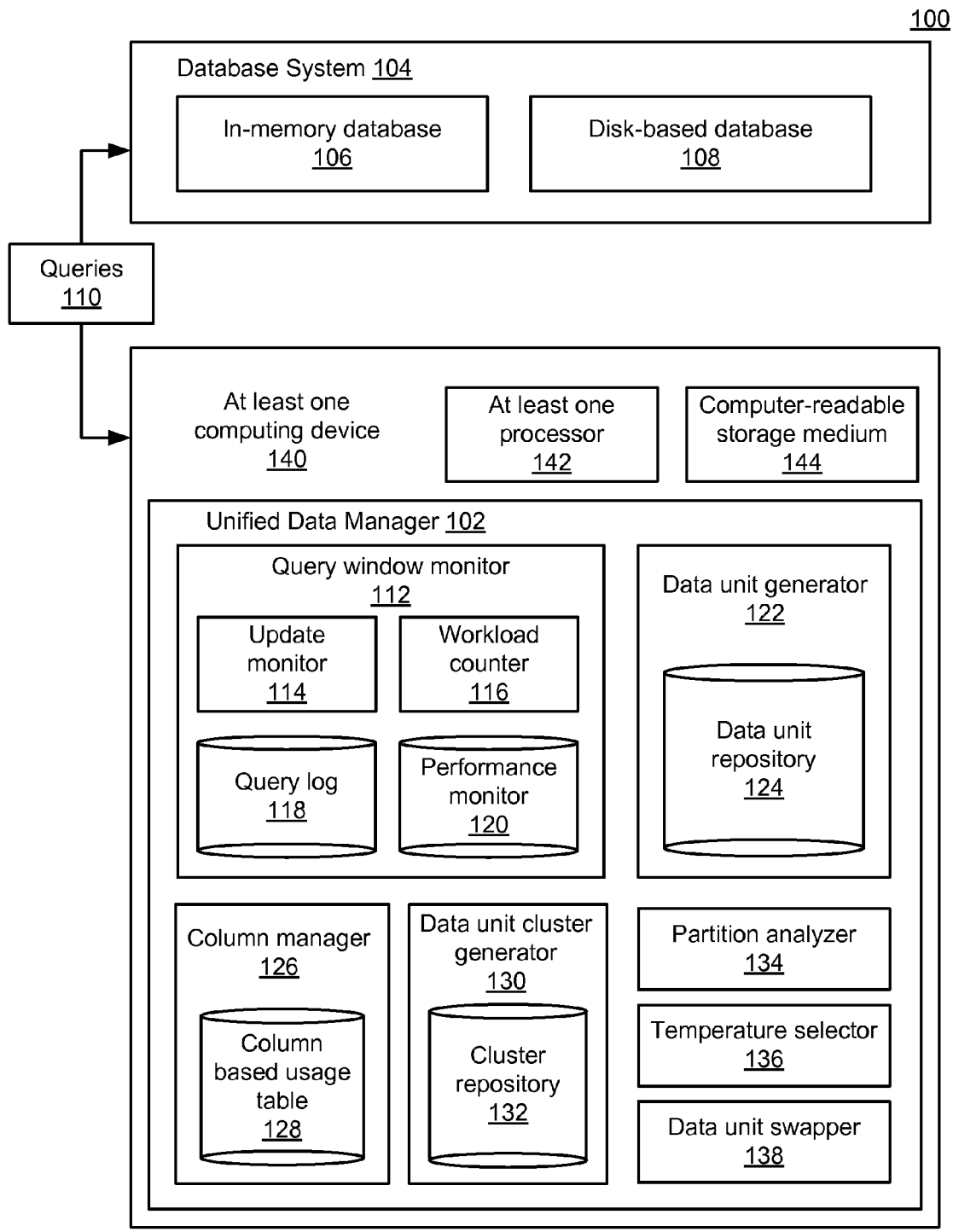
FIG. 1 is a block diagram of a system for unified data management for in-memory databases.

FIG. 1 is a block diagram of a system 100 for unified data management for in-memory databases. In the system 100 of FIG. 1, a unified data manager 102 is configured to manage, facilitate, and optimize operations of a database system 104 that includes an in-memory database 106 and a disk-based database 108, so that queries 110 applied against data of the database system 104 are satisfied quickly and efficiently, and in accordance with cost and other service level agreement (SLA) constraints.

In the example of FIG. 1, the database system 104 includes an in-memory database 106, which generally refers to a type of database and related database management system that partially or primarily relies on a main memory of an underlying hardware platform for storing and accessing data. In this context, main memory refers to volatile, random access memory (RAM) that provides relatively fast data access, as compared, for example, to disk-based storage systems, such as the illustrative disk-based database 108 of FIG. 1. In-memory databases are also known as, for example, main memory databases, or memory resident databases.

Thus, in the example of FIG. 1, the in-memory database 106 may be understood to represent the type of main, RAM, volatile memory database referenced above, while the disk-based database 108 may be understood to represent a disk-based database. The type of main memory database represented by the in-memory database 106 generally provides considerably faster access and response times to data stored thereon than can be provided by the disk-based database 108. On the other hand, a number of challenges and constraints exist with respect to the use of the in-memory database 106 in this regard.

For example, generally speaking, a cost associated with the purchase and/or use of the in-memory database 106 will generally be higher than a cost associated with the disk-based database 108. Moreover, it can be challenging to load data to the in-memory database 106 (or remove data therefrom) in a timely, efficient, and cost-effective manner. Nonetheless, given the relative high cost of the in-memory database 106 just referenced, it is generally not feasible or desirable to utilize a primary memory so large that all desired data may be contained therein. Consequently, it is desirable or necessary to be able to remove data having low usage from the in-memory database 106, for replacement thereof with data having high usage (e.g., with respect to the queries 110).

Thus, the multi-tiered memory structure of the database system 104 provides a number of advantages. For example, as may be appreciated from the above description, use of the relatively less expensive disk-based database 108 to store at least some of the data of the database system 104 will reduce overall costs, as compared to a similar system that attempts to store most or all data to be accessed using the in-memory database 106. However, as also just described, the use of the disk-based database 108 also reduces data access times, as compared to a database system that relies more heavily or more completely on the use of the in-memory database 106.

Moreover, to provide further features and advantages, it is possible to leverage multiple memories within each of the in-memory database 106 and the disk-based database 108. That is, each of the in-memory database 106 and the disk-based database 108 may include both a main memory and a disk memory, as illustrated and described below in more detail, e.g., with respect to FIGS. 2-4. As described below, whereas the in-memory database 104 includes a relatively large main memory that is leveraged for fast data access, the in-memory database 104 also may include its own disk memory that can be used, e.g., for temporary data storage. Meanwhile, similarly but conversely, the disk-based database 108 may also include both a (relatively smaller) main memory and a disk memory, where the latter (disk) memory is used primarily for larger-scale backup storage of data that is not currently being frequently accessed.

As referenced above and described in more detail below, the unified data manager 102 is configured to provide a desired balance and/or optimization between the above and other competing factors characterizing use of the database system 104. For example, the unified data manager 102 may be configured to characterize data of the database system 104 (e.g., with respect to a frequency or recency of usage thereof by the queries 110), group sets of the data into related data units, cluster the related data units into data unit clusters, and otherwise generate and utilize metadata regarding the stored data in a fashion that facilitates intelligent decision making regarding operations of the database system 104. For example, the unified data manager 102 may be configured to determine which portions of the data are stored in the in-memory database 106 versus the disk-based database 108, as well as whether, when, and how data is transferred between the in-memory database 106 and the disk-based database 108. Further, the unified data manager 102 may determine whether, when, and how to move data within the in-memory database 106, e.g., between the main memory and the disk memory of the in-memory database 106.

Thus, customers using the database system 104 (e.g., users providing the queries 110) may be provided with a highly customizable experience in accessing data of the database system 104. For example, such customers may make desired decisions with regard to cost savings incurred through the use of larger amounts of disk-based storage represented by the disk-based database 108, as compared to access time improvements gained by larger main memories used by the in-memory database 106. Further, these benefits may be provided by the unified data manager 102 in a highly or completely automated manner, without requiring significant or any contribution from a human database administrator (DBA) in charge of administering the database system 104.

Instead, the unified data manager 102 is configured to utilize query access patterns and other characteristics of the queries 110 to automatically make adjustments to the manner in which data is stored, allocated between, transferred between, or otherwise utilized by the in-memory database 106 and the disk-based database 108. In particular examples, the queries 110 represent a stream of queries received over a period of time, where a type or nature of the queries may change over time. For example, the queries 110 may vary seasonally with respect to a current time of the year, or may change in response to additions or other changes made with respect to content of the data of the database system 104.

Again, the unified data manager 102 is configured to automatically respond to these types of changes to the queries 110, and other external or internal changes experienced by the system 100, to thereby re-balance or otherwise re-optimize characteristics and operations of the database system 104, so that customers or other users providing the queries 110 remain satisfied with the operation and cost of the database system 104.

Although FIG. 1 and the corresponding description thereof are provided with respect to the database system 104, it will be appreciated that the techniques described herein with respect to the unified data manager 102 may be implemented with respect to other types of databases that may use multiple memories in the manners described herein. Nonetheless, the present description is provided with respect to the type of database system 104 of FIG. 1, such as, for example, the HANA in-memory database of SAP SE of Waldorf, Germany, because these and related types of databases may benefit from the techniques described herein.

For example, in-memory databases have vastly improved a speed of processing of extremely large volumes of data, using, for example, multi-core parallelism and in-memory compression techniques, thereby reducing or eliminating typical bottlenecks associated with stand-alone disk-based databases. Nonetheless, in implementations in which a data volume grows into terabytes and petabytes, or more, keeping all data to be searched in memory becomes unreasonably or undesirably expensive, and otherwise impractical. Therefore, as referenced above, the disk-based database 108 may be implemented as a secondary, disk-based storage that is used to store data not required for analysis at that point in time.

By way of terminology, such data that is not immediately required for analysis at a given point in time may be referred to as "warm" data, while data that may be immediately required for the execution of queries may be referred to as "hot" data. During operation of the database system 104, as described in detail herein, different types and volumes of data may be transferred between the in-memory database 106 and the disk-based database 108, in various amounts, manners, and timeframes. For example, data may be moved between the main memory of the in-memory database 106 and a local disk memory of the in-memory database 106, in order to match current memory demands, such as when the main memory of the in-memory database 106 becomes full. Such data movement may occur quickly with respect to the queries 110, and without requiring large scale reorganizations of a manner in which the overall volumes of the data are formatted, organized, or otherwise stored within the databases 106, 108.

On the other hand, in other examples, particularly over relatively longer timeframes of operation of the system 100, it may in fact become necessary to perform such larger scale data reorganizations. For example, over a given period of time, the queries 110 may change substantially in terms of a number of queries received in a given unit of time, or with respect to a type of content being queried, or with respect to the type of query being received. For example, where the database system 104 is associated with retail, consumer transactions, the queries 110 may be substantially different in number and content during the holiday shopping season, as compared to during a summer season.

Thus, in order to optimize operations of the database system 104 and fully leverage an availability and use of the databases 106, 108, various associated techniques for organizing and storing data may be used. For example, it is common in in-memory databases to store data using columnar or column-based tables, in which data is stored and accessed by column, rather than being entered and retrieved by row. Such column-based databases have various known advantages, such as high speed access and high levels of data compression. Through the use of such column-based database techniques, the types of relatively small-scale, frequent data movement between a main memory and local disk memory of the in-memory database 106 may be implemented simply by moving groups of columns therebetween.

Meanwhile, in order to increase access speeds and provide the types of relatively larger scale, longer term transitions in data formatting and storage within the database system 104, the data may be partitioned into pluralities of data partitions within the databases 106, 108. Because such partitions are grouped in a manner that reflects query access patterns of the queries 110, it is possible to load entire partitions of data into the in-memory database 106, for access thereof by the queries 110. When the unified data manager 102 determines that it would be beneficial or necessary, a repartitioning of the data within the databases 106, 108 may be executed, so as to thereby optimize immediately subsequent operations of the database system 104 with respect to the current workload of queries.

Figure 2:
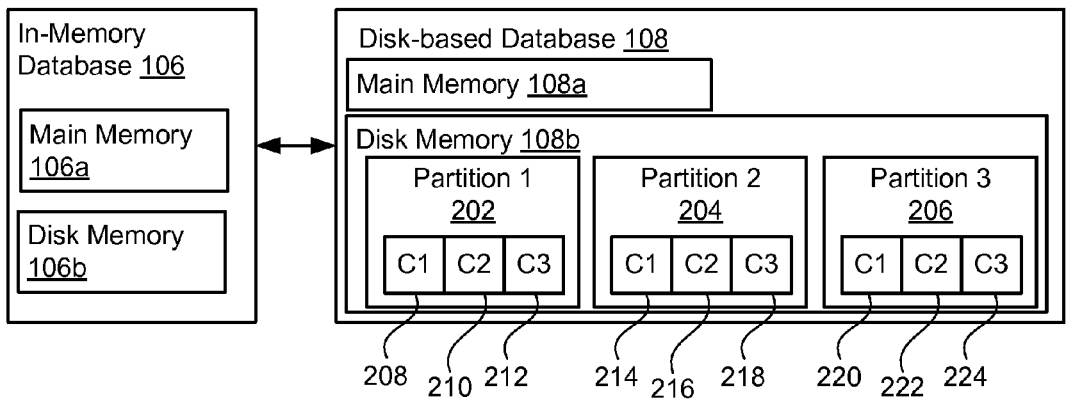
FIG. 2 is a block diagram of a first example of a data allocation scheme.
Figure 3:
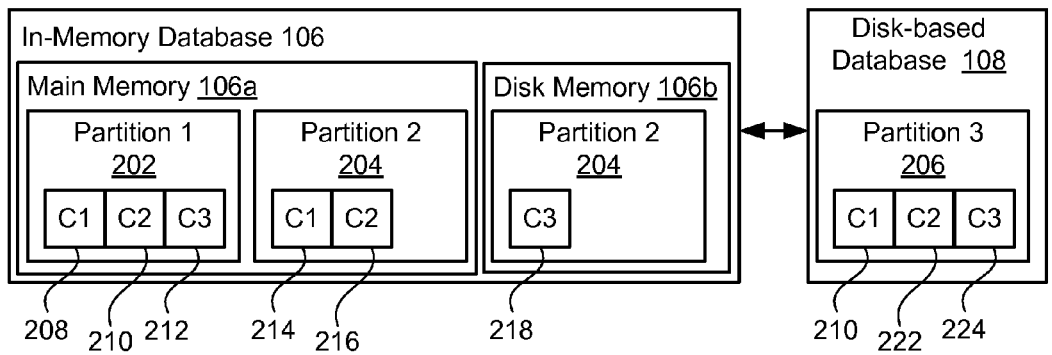
FIG. 3 is a block diagram of a second example of a data allocation scheme.
Figure 4:
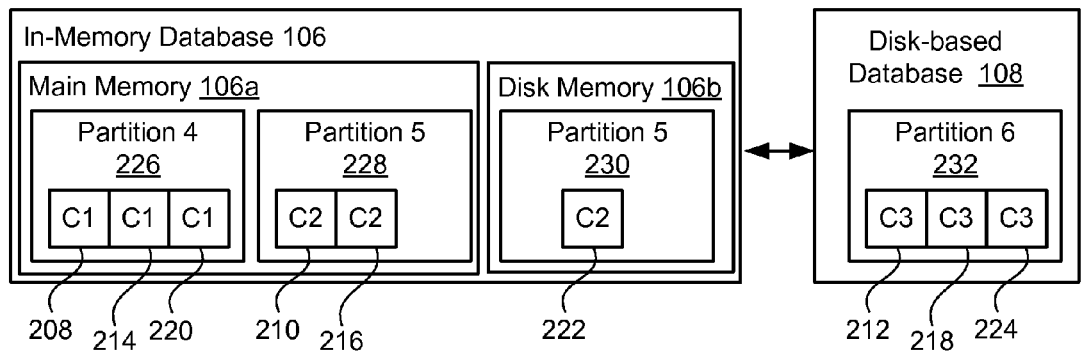
FIG. 4 is a block diagram of a third example of a data allocation scheme.

By way of simplified illustration and example, FIGS. 2-4 provide example implementations of the databases 106, 108. As may be appreciated, the examples of FIGS. 2-4 are intended merely as highly simplified examples illustrating minimal amounts of data required to provide explanation with respect to the concepts and terminology just introduced.

For example, as shown in FIG. 2, the in-memory database 106 is illustrated as including a main memory 106a and a local disk memory 106b. The in-memory database is illustrated in an initial or beginning state, in which no data has been loaded. Meanwhile the disk-based database 108 is illustrated as including a local main memory 108a and a disk memory 108b. That is, as referenced above, the disk-based memory 108 may include a local main memory 108a that performs conventional memory functions, but is generally much smaller, and not used for in-memory data access like the main memory 106a of the in-memory database 106. The disk-based memory 108 also includes a disk memory 108b that is used to provide data storage for warm data, as referenced above (the separate memories 108a, 108b are not illustrated in FIGS. 3 and 4 for brevity, and it is assumed that data stored using the disk-based database 108 is primarily stored using the disk memory 108b).

The disk-based database 108 is illustrated as including data that has been partitioned into a first partition 202, a second partition 204, and a third partition 206. Again, as referenced above, and described in detail below, each of the partitions 202, 204, 206 has been organized by the unified data manager 102, e.g., based on similarities in data content within each partition, and on relationships to the queries 110.

Further, the first partition 202 illustrates the column C1 208, a column C2 210, and a column C3 212. The second partition 204 is illustrated as including the column C1 214, a column C2 216, and a column C3 218. The third partition 206 is illustrated as including a column C1 220, a column C2 322, and a column C3 224.

In the example of FIG. 3, the first partition 202 and the second partition 204 have been classified as hot data and loaded into the in-memory database 106. Specifically, the in-memory database 106 is illustrated as having had the first partition 202 and part of the second partition 204 loaded into the main memory 106a. That is, as shown, the columns 208-212 of the first partition 202 have all been moved from the disk-based database 108 to the main memory 106a of the in-memory database 106. Meanwhile, columns 214, 216 of the second partition 204 have been loaded to the main memory 106a, while the column 218 of the second partition 204 remains in the local disk memory 106b of the in-memory database 106. As referenced above, if the main memory 106a of the in-memory database 106 holds a maximum of five columns of data, and the column 218 is required for responding to one or more incoming queries of the queries 110, it may be necessary for the unified data manager 102 to evict at least one of the columns 208-216 from the main memory 106a of the in-memory database 106, in order to immediately load the column 218. Techniques for determining which of the columns 208-216 to evict from the in-memory database 106 in order to load the column 218 from the local disk memory 106b, and related column management techniques, are described in detail below with respect to FIG. 1.

In the example of FIG. 4, it is assumed that the unified data manager 102 has determined a need to re-partition all the data stored within the existing partitions 202-206. Specifically, as shown, a new, fourth partition 226 is illustrated as having been created and loaded into the main memory 106a of the in-memory database 106, and includes 208, 214, 220. Meanwhile, a new, fifth partition 228 is illustrated as being loaded within the main memory 106a of the in-memory database 106 and including columns 210, 216. A remaining portion of the new, fifth partition 230 is illustrated separately within the local disk memory 106b of the in-memory database 106 as including a remaining column of the fifth partition, column 222, in order to again illustrate the potential need to load partition data on a column by column basis from the local disk memory 106b to the main memory 106a of the in-memory database 106. Finally in FIG. 4, a new, sixth partition 232 is illustrated as including columns 212, 218, 224. As shown, the sixth partition 232 represents warm data stored in the disk-based database 108, as compared to the hot data of the partitions 226, 228/230 loaded into the in-memory database 106.

As may be observed from the simplified example of FIG. 4, it is assumed that no new data has been added to the data stored in the databases 106, 108, but that the unified data manager 102 has nonetheless determined that a re-partitioning of the data will be beneficial for optimizing query response patterns to current and anticipated workloads of the queries 110. In various other examples, as described below, re-partitioning may occur in response to insertions or other updates performed with respect to the stored data; i.e., it may be beneficial to re-partition the data when relatively large amounts of new data are added. Somewhat similarly, it may be beneficial to re-partition the data in response to other external stimuli or triggers, such as when new applications are used to generate the queries 110 and/or access the database system 104.

Returning to FIG. 1, but with reference as needed to the illustrated examples of FIGS. 2-4, it is described below how the unified data manager 102 provides a unified approach for optimizing memory usage proportional to the data required for analysis. Such a unified optimization approach provides automatic and accurate identification of a desirable or optimized partitioning scheme, including re-partitioning dynamically and on the fly. The unified approach also provides automatic identification of hot and warm data, thereby facilitating movement of relevant data between the databases 106, 108. Further, the unified data manager 102 provides desirable or optimized column management techniques for swapping columns between the memories 106a, 106b in the manner illustrated and described with respect to FIGS. 2-4. As also described in detail, such operations of the unified data manager 102 may be based on real time, automatic analysis of query access patterns of the queries 110, so that the various advantages related to re-partitioning, hot/warm data identification, and column management may be provided with little to no input or involvement from human database administrators.

In the example of FIG. 1, the unified data manager 102 is illustrated and described with respect to a number of components and sub-components 112-138 thereof. Each of the components and sub-components 112-138 is introduced and described with respect to FIG. 1. Corresponding ones of remaining figures, and associated descriptions thereof, provide additional details and examples regarding potential implementations of, and interactions between, the various components and sub-components 112-138.

For example, a query window monitor 112 of the unified data manager 102 refers to a component configured to monitor each incoming query of the queries 110. In this context, the referenced query window refers to a defined set of queries of the queries 110, which provides for a capture of a workload or query access pattern over the number of queries of the query set.

The query window monitor 112 includes an update monitor 114 that checks each individual query to determine whether it includes an insertion or other update of the data stored in the database system 104. As referenced above and described in detail below, such modifications to the stored data may be useful in determining a need for re-partitioning or other management of the stored data.

The query window monitor 112 also includes a workload counter 116. In this context, a query workload refers to a set of queries that is larger than the query set of a query window. In other words, for example, a query workload may include a determined number or plurality of query windows, and may therefore be collected and analyzed over relatively longer periods of time than individual query windows.

A query log 118 is illustrated and may be utilized to maintain a log of individual queries and query characteristics over time, including types of queries, types of content being queried, query response times, and other query characteristics. In particular, a performance monitor 120 may be configured to monitor query response times and other performance characteristics related to processing of the queries 110, and results of such performance monitoring, along with outputs of the update monitor 114 and the workload counter 116, may be stored within the query log 118.

In operation, the query window monitor 112 therefore avoids considering re-partitioning or data movement after each individual query, although each individual query is analyzed and characterized. In this way, the query window monitor 112 reduces cost and considers larger scale query access patterns, including scenarios in which sequences of queries may each be substantially different from one another.

In example implementations, the query window monitor 112 maintains a sliding query window of fixed checkpoint size N to capture the online workload or query access pattern. The query window monitor 112 further slides the query window once it grows to a maximum size, to thereby capture the latest workflow trends, while keeping a snapshot of the most recent query window, using the query log 118.

By way of notational definition, an online workload $w_{t_k}$ includes a stream of queries $\{q_0, \ldots, q_{t_{k-1}}, q_{t_k}\}$ a received until a time $t_k$ where $t_k > t_k-1 > \ldots > 0$. Then, again by way of definitional notation, a query window W with $W_{t_k}^N$ contains the most recent N queries in the online workload $W_{t_k}$, i.e., $W_{t_k}^N \subseteq W_{t_k}$.

As also described, the query window monitor 112 monitors the query log 118 to track query performance over the query window $W_{t_k}^N$. After every checkpoint size N of new queries in the query window, or when degraded query performance over the query window is found by the performance monitor 120, partition analysis may be triggered based on the retained snapshot of the query window, while the query window is reset.

The workload counter 116 increases after every set of new sliding query windows, as described above. After each related checkpoint size M of new workloads, or in response to another trigger such as a batch insert or update detected by the update monitor 114, the query window monitor 112 may be configured to trigger the data unit generator 122.

As described in detail below, the data unit generator 122 is generally configured to characterize sets of data records within the stored data, based on one or more shared common values for one or more of a given set of attributes. In other words, the data unit generator 122 finds granular, uniformly (or almost uniformly) sized units of data that may be used as the basis for defining the partitions of the databases 106, 108, e.g., the partitions 202-206 and the re-partitioned partitions 226-232 of FIGS. 2-4. As shown, the data unit generator 122 may store a data unit repository 124 containing metadata that characterizes and defines current or potential data units to be generated. As with the query window monitor 112, the data unit generator 122 may track query and data characteristics with respect to each individual received query of the queries 110, and then operate to generate new or reorganized data units over larger timeframes and/or query sets, such as following a determination of a maximum value of the workload counter 116 being reached.

Column manager 126, as referenced above, is configured to operate to place columns within the main memory 106a of the in-memory database 106 that are most likely to be used in satisfying current queries of the queries 110, which also necessitates evicting or removing columns from the main memory 106a to the local disk memory 106b of the in-memory database when the main memory 106a is full or nearly full. For example, with reference back to FIG. 3, the column manager 126 may be configured, as already described, to load columns 208-212, 214, and 216 into the main memory 106a. At a later time, if it is determined that the column 218 should be loaded to the main memory 106a of the in-memory database 106, then the column manager 126 must select one or more of the columns 208-212, 214, and 216 to remove from the main memory 106a of the in-memory database 106, into the local disk memory 106b. For example, the column manager 126 might evict the column 216 from the main memory 106a, for relocation within the local disk memory 106b, and for replacement by the column 218.

Multiple example techniques are described below to explain operations of the column manager 126 in determining which columns to load and/or evict from the main memory 106a of the in-memory database 106. In general, thus, many such techniques utilize column usage specifics collected by the column manager 126 and stored using a column-based usage table 128.

For example, the column manager 126 may select columns for eviction based on a relative frequency and/or regency of use. For example, columns that have not been used recently or frequently may be most likely to be evicted.

In other examples, columns that have been used frequently but not recently may be judged relative to one another, and relative to columns that have been used recently, but not frequently. Again, by analyzing these and related column usage factors, column manager 126 may operate to load appropriate columns into the in-memory database 106 in a manner that increases the likelihood of satisfying current and expected queries of the queries 110.

A data unit cluster generator 130 is configured to utilize data units generated by the data unit generator 122 to determine data unit clusters, the definitions and parameters of which may be stored using a cluster repository 132. As explained in detail below, data unit clusters refer to groupings or sets of data units that are organized for the purpose of ensuring that data is organized and stored correctly within the primary 106 and the disk-based database 108, including ensuring that data most likely to store current and expected queries of the queries 110 will be loaded into the in-memory database 106 (and into the main memory 106a) in a timely and efficient manner.

In this regard, data clusters thus refer to groups of data units having shared cluster characteristics. For example, as described herein, data units may be defined with respect to shared values or sets of values. For example, a plurality of data units may be defined with respect to country values, so that the first data unit includes data sharing the value country=Germany, while another data unit is defined based on a shared country value of country=U.S.A. In some examples, it may be useful to group data based on a country of origin (e.g., a country of origin of a product for sale), as well as on a year of production of the product in question. Thus, the data unit cluster generator 130 may define data clusters based on countries of origin and years of production. Of course, such examples are intended merely as simplified examples for purposes of explanation, and data unit clusters may be defined with respect to larger members of data units, or in virtually any manner that is predicted to enhance a likelihood and speed of satisfaction of current and expected queries of the queries 110.

In particular, for example, a partition analyzer 134 may be configured to utilize information determined by the data unit generator 132 and/or the data unit cluster generator 130, to thereby define, and redefine, the various data partitions to be used within the database system 104.

A temperature selector 136 may be configured to identify the resulting partitions data as being either hot or warm in the sense described above with respect to the in-memory database 106 and the disk-based database 108. Finally with respect to the unified data manager 102, a data unit swapper 138 may be configured to execute actual data transfers at a physical database level, with minimum swaps between the data units, resulting in the re-partitioning and movement of data between the hot data and the warm data. As described herein, all such operations may be implemented in a unified manner, based on the definition, generation, and use of the data units provided by the data unit generator 122.

By way of example with respect to the operation and implementation for the unified data manager 102, FIG. 1 illustrates that the unified data manager 102 may be constructed and executed using at least one computing device 140, which includes at least one processor 142, and non-transitory computer readable storage medium 144. That is, for example, the at least one computing device 140 may represent two or more computing devices operating in parallel, and in communication with one another, perhaps over a single computer network. Similarly, the at least one processor 142 may represent two or more processors or processing cores that are operating in a parallel, or otherwise in conjunction with one another. Meanwhile, as referenced in more detail below, the computer readable storage medium 144 may represent virtually any type of computer memory suitable for storing instructions thereon, which, when executed by the at least one processor 142, provides and implements the unified data manager 102.

Figure 5:
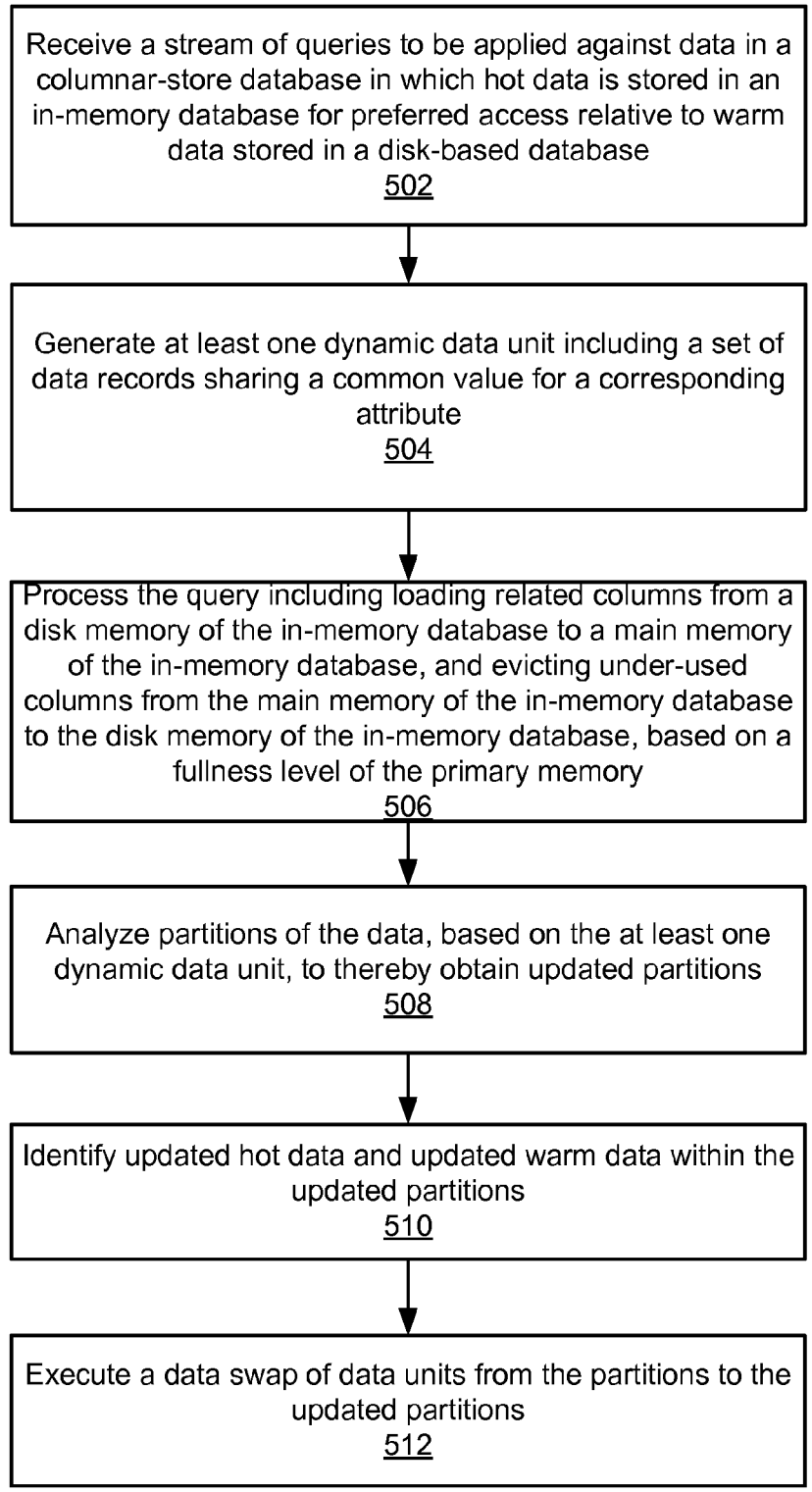
FIG. 5 is a flowchart illustrating example operations of the system of FIG. 1.

FIG. 5 is a flowchart 500 illustrating example operations 502-512 of the system 100 of FIG. 1. In the example of FIG. 5, operations 502-512 are illustrated as separate, sequential operations. However, it will be appreciated that the flowchart 500 may include additional or alternative operations, and/or may have one or more illustrated operations omitted in whole or in part, and/or may include one or more sub-operations for each such operation. In all such implementations, various operations and sub-operations may be performed in a partially or completely overlapping or parallel manner, or a nested, iterative, looped, or branched fashion.

In the example of FIG. 5, a stream of queries to be applied against data in a columnar-store database in which hot data is stored in an in-memory database for preferred access relative to warm data stored in a disk-based database is received (502). For example, as described, the query window monitor 112 may be configured to receive the queries 110, where, as described, the queries 110 are also received for processing against data stored at least in the in-memory database 106. As already described, the in-memory database 106 may be configured to store hot data that is predicted to be most likely to be used in satisfying the received queries, as compared to warm data stored in the disk-based database 108.

At least one dynamic data unit may be generated, the at least one dynamic data unit including a set of data records sharing a column matching a value for a corresponding attribute (504). For example, the data unit generator 122 may determine a precipitating event for generating data units based on received queries. As referenced above, and described in detail below, such a trigger or precipitating event for generation of data units may include a completion of a workload counter as determined by the workload counter 116, or a batch update or insertion of data, as determined by the update monitor 114. At that point, for example, the data unit generator 122 may utilize data unit data from within the data unit repository 124, collected over a preceding number of queries of the queries 110, in order to generate new or updated dynamic data units.

The query may be processed including loading related columns from a disk memory of the in-memory database to a main memory of the in-memory database, and evicting under-used columns from the main memory of the in-memory database to the disk memory of the in-memory database, based on a fullness level of the primary memory (506). For example, the column manager 126 may be configured, as referenced above and described in detail below, to select columns presently located within the main memory 106*a* of the in-memory database 106, and, based on the column-based usage table 128, may select columns for eviction thereof to the disk memory 106*b*.

Partitions of the data may be analyzed, based on the at least one dynamic data unit, to thereby obtain updated partitions (508). For example, as referenced above and described in detail below, a partition analysis trigger may including any information received by the partition analyzer 134 that indicates the possibility of an increased speed and/or efficiency improvement with respect to satisfying the current and expected queries of the queries 110. For example, such partition analysis trigger may include a detection by the query window monitor 112 that the query window is full, and/or may include a determination by the partition analyzer 134 that a performance of the database system 104 is degrading, based on information from the performance monitor 120.

Updated hot data and updated warm data may be identified within the updated partitions (510). For example, the temperature selector 136 may analyze the updated partitions provided by the partition analyzer 134, and determine which of the partitions should be included within the in-memory database 106 as representing current hot data, and as compared to data currently considered to be warm data and suitable for storage within the disk-based database 108.

Finally in the example of FIG. 5, a data swap of data units from partition to the updated partitions may be executed (512). For example, the data unit swapper 138 may be configured to execute data transfers to obtain the desired, updated partitions, such as referenced and illustrated above with respect to the partitions 202-206 and the updated partitions 226-232 of FIGS. 2-4.

Thus, as may be appreciated from the above, and as described in more detail below, the unified data manager 102 of FIG. 1, and related operations of FIG. 5, address a number of concerns and challenges in the field of in-memory database management, in a unified and complimentary manner that ensures memory usage that is proportional to the workload of the queries 110.

For example, for a given workload, query patterns define hot data as compared to warm data, and help determine decisions regarding data movement between the in-memory database 106 and the disk-based database 108. Furthermore, given that the data resides in one or more partition tables, a partitioning scheme may be configured that aligns with the query access pattern, for optimal query performance so that aggregate queries can be fully shared between all partitions (for servers).

Described techniques also address situations in which sudden workload changes occur, such as when a database system has to handle sudden bursts or peaks of workload environments. For example, an online store may sell much higher volumes of goods in the weeks leading up to Christmas, or an OLAP (Online Analytical Processing) system may have to adjust to new query patterns. In such scenarios, it is not acceptable or satisfactory for users to wait for a human database administrator and applicable advisory tool to reconfigure the database system, or to otherwise experience system stalls due to peak workloads.

Other scenarios related to handling a sudden influx of data may relate, for example, to data uploads having seasonal variations, such as data recorded by monitoring sensors (e.g., time series data) which peak during machine faults. Such scenarios may lead to unequal data distribution among multiple servers implementing the database system 104, thereby leading to load and balances and general poor performance.

Accordingly, the unified data manager 102 of FIG. 1 provides an engine that manages memory of the database system 104 in the context of the described multi-tiered in-memory columnar database architecture, while optimizing database memory usage proportionally to the data required for analysis. In order to accomplish these goals, as described, effective partitioning and re-partitioning may be implemented by the partition analyzer 134, based on data unit analysis of the data unit generator 122 and the data unit cluster generator 130. In particular, as already referenced, the performance of modern databases often rely on a proper partitioning scheme in order to exploit parallelism over large datasets. Identifying such proper partitioning schemes is difficult for even experienced database administrators, as it is required to understand physical query execution plans for each query in the workload.

Moreover, even if a human database administrator finds an acceptable partitioning scheme, it may be necessary to update the partitioning scheme in a timeframe that the human database administrator cannot satisfy. For example, as referenced, the workload of queries may change over time, due to new database applications being used, and increasing data that size, or an increasing number of queries. In these and related scenarios, existing partitioning strategies may be quickly and efficiently revisited by the partition analyzer 134, thereby effectively identifying a proper partitioning scheme, and scheduling a resulting re-partitioning, with little or no involvement of any human database administrator.

With respect to data temperature management on the part of the temperature selector 136, as referenced above, storage of terabytes, petabytes, or larger quantities of data using the in-memory database 106 may not be a feasible or reasonable approach to obtaining the benefits of the database system 104, particularly for customers using a "pay as you go" pricing model. Although existing in-memory databases, such as the SAP HANA dynamic tiering, address this issue by providing users with the type of primary and secondary memory architecture described with respect to FIG. 1, the temperature selector 136 of FIG. 1 enables an enhanced ability to obtain a desired price/performance balance, by effectively identifying hot and warm data and facilitating data movement between the in-memory database 106 and the disk-based database 108.

With respect to column management by the column manager 126, including column onloading and offloading at the in-memory database 106, the column manager 126 may continually load the in-memory database 106 until the in-memory database 106 reaches some threshold or fullness, e.g., becomes 95% full. At that point, the column manager 126 may begin to unload partition columns, based on the column-based usage statistics stored using the column-based usage table 128. As already referenced, the column manager 126 may determine and define column swaps based not just on a recency of use of the columns, but also on the basis of other factors, including relative frequency of data access, based on query access patterns.

Figure 6:
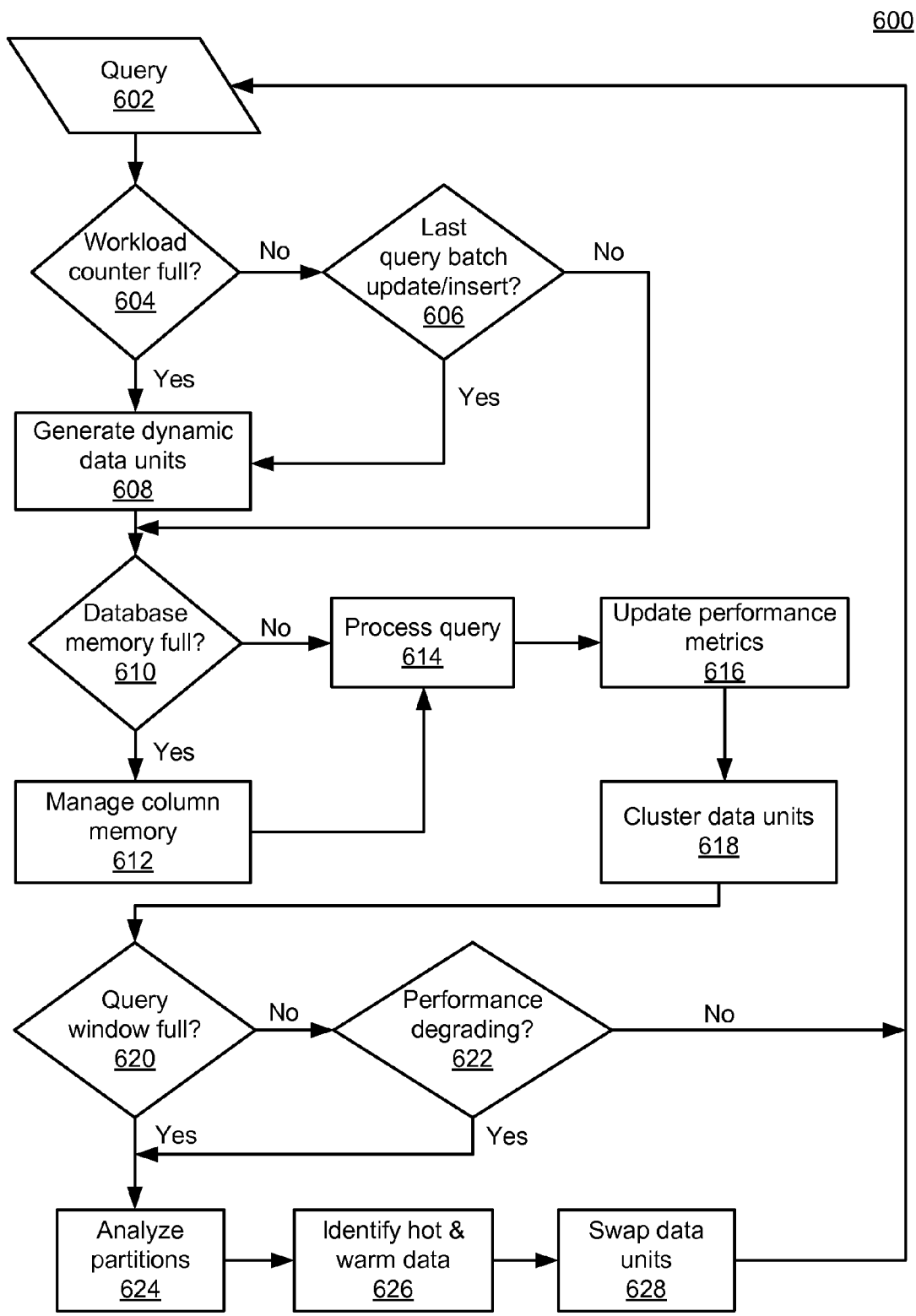
FIG. 6 is a more detailed flowchart illustrating example operations of the system of FIG. 1.

FIG. 6 is a flowchart 600 illustrating more detailed example operations of the flowchart 500 of FIG. 5. In the example of FIG. 6, a query is received (602). If the workload counter is not full (604), as determined by the workload counter 116 of the query window monitor 112, then a determination may be made as to whether the query was a batch update or insert query (606). If so, or if the workload counter was determined to be full (604), then additional dynamic units may be generated (608).

In other words, as already described, either a filling of the workload counter or a change in the stored data may serve as a trigger for causing a generation of new or updated dynamic data units by the dynamic data unit generator 122. As also described, regardless of whether the current query is associated with generation of new or updated data units, the data unit generator 122 may store related data unit characteristics. In other words, data unit characteristics may be stored on a query by query basis, but actual data unit updates are only initiated in response to one or more appropriate triggers. Of course, other data unit generation triggers may be utilized that are not specifically illustrated in the example of FIG. 6, such as change event database applications accessing the database system 104.

If the database memory is full (610), e.g., the in-memory database 106 has reached a predetermined fullness threshold, then column memory management (612) may be required on the part of the column manager 126. Otherwise, the query may be processed due to loading of required partition columns into the in-memory database 106 (614), or through the use of partition columns already stored within the in-memory database 106. Of course, the query processing (614) may also occur after completion of any appropriate column memory management that may have been required (612).

Upon completion of the query processing, performance metric may be updated (616). For example, the performance monitor 120 may update performance metric stored within the query log 118. As with the data unit characteristics above, performance metric may be updated on a query by query basis, even though action taken with respect to changes and performance metric may be taken only on larger time scales.

At this point, data unit clusters may be defined, or redefined (618). For example, the data unit cluster generator 130 may define updated data unit clusters, based on any new data units already provided in response to the current query. Of course, it may also be possible to re-cluster existing data units, in scenarios in which new data units were not generated in response to the current query.

If the query window is not full (620), as determined by the query window monitor 112, then the partition analyzer 134 may determine whether the query performance, as based on data received from the performance monitor 120, is degrading (622). If not, then a next subsequent query may be received (602). On the other hand, if either the query window is full (620), or the query performance is determined to be degrading (622), then the partition analyzer 134 may recognize a partition analysis trigger, and may proceed to analyze existing partitions (624).

Once re-partitioning has occurred, the temperature selector 136 may proceed to identify hot and warm data within and among the newly re-partitioned data (626). Finally in FIG. 6, the data unit swapper 138 may proceed to swap data units as needed (628), based on the just-described re-partitioned analysis and hot/warm data identification.

FIG. 7 is a flowchart 700 illustrating more detailed example operations of the data unit generator 122 of FIG. 1. As described above with respect to FIG. 1, the data unit generator 122 utilizes dynamic data units which provide an extremely granular level of partitioning units, based on attribute values shared between sets of data records, and used as a basis for defining partitioning schemes, implementing movement of columns within the in-memory database 106, and identifying data as belonging in either hot or warm data stores.

In more detailed examples that follow, a dynamic data unit set $D_u = u_1, u_2, \ldots, u_n$ is the set of n uniformly, or almost uniformly, size granular units of data. Such dynamic data units are defined as sets of records sharing a common value for a given attribute or set of attributes (e.g., for a given column or set of columns). Each data unit may be represented as a pair of vectors. Specifically, a data unit can be described as a first vector that is a Boolean vector $[b_0, b_1, \ldots, b_{|C|}]$. The second vector defining a data unit or set of data units is a vector of column values $[v_0, v_1, \ldots, v_{|C|}]$. In the preceding notation, C is the set of attributes/columns, and $|C|$ is the cardinality of C. In the preceding definitions, $b_i$ are indicator functions which can be defined as:

$$b_i: C \to \{0, 1\}; b_i = \begin{cases} 1, & \text{if } c_i \in u_k \\ 0, & \text{otherwise.} \end{cases} \quad \text{Definition 1}$$

In the preceding definition, the $v_i$ values are values of the columns which specify the granularity of the data units being defined. For example, if a data unit depends only on the first two columns of a set of records, then the data unit may be represented as ([1100 . . . 0], [Value ($c_1$), Value ($c_2$)]). On an implementation level, a dynamic data unit may be stored as a 2-tuble of integer representation of the vector of Boolean indicator functions, and a hash of the value vector. In such implementations, instead of moving each record, it is possible to migrate a set of data records that can be identified on a granular basis, based on certain fixed attributes, e.g., using a simple SELECT statement.

The above definition of data units inherently cause the data unit to be of (substantially) uniform size, so that a cost of moving data units will be equivalent for each data unit or set of data units. As described in detail below, such migration costs may be useful to the partition analyzer 134, e.g., with respect to a cost benefit analysis of creating or modifying proposed partitions.

Figure 7A:
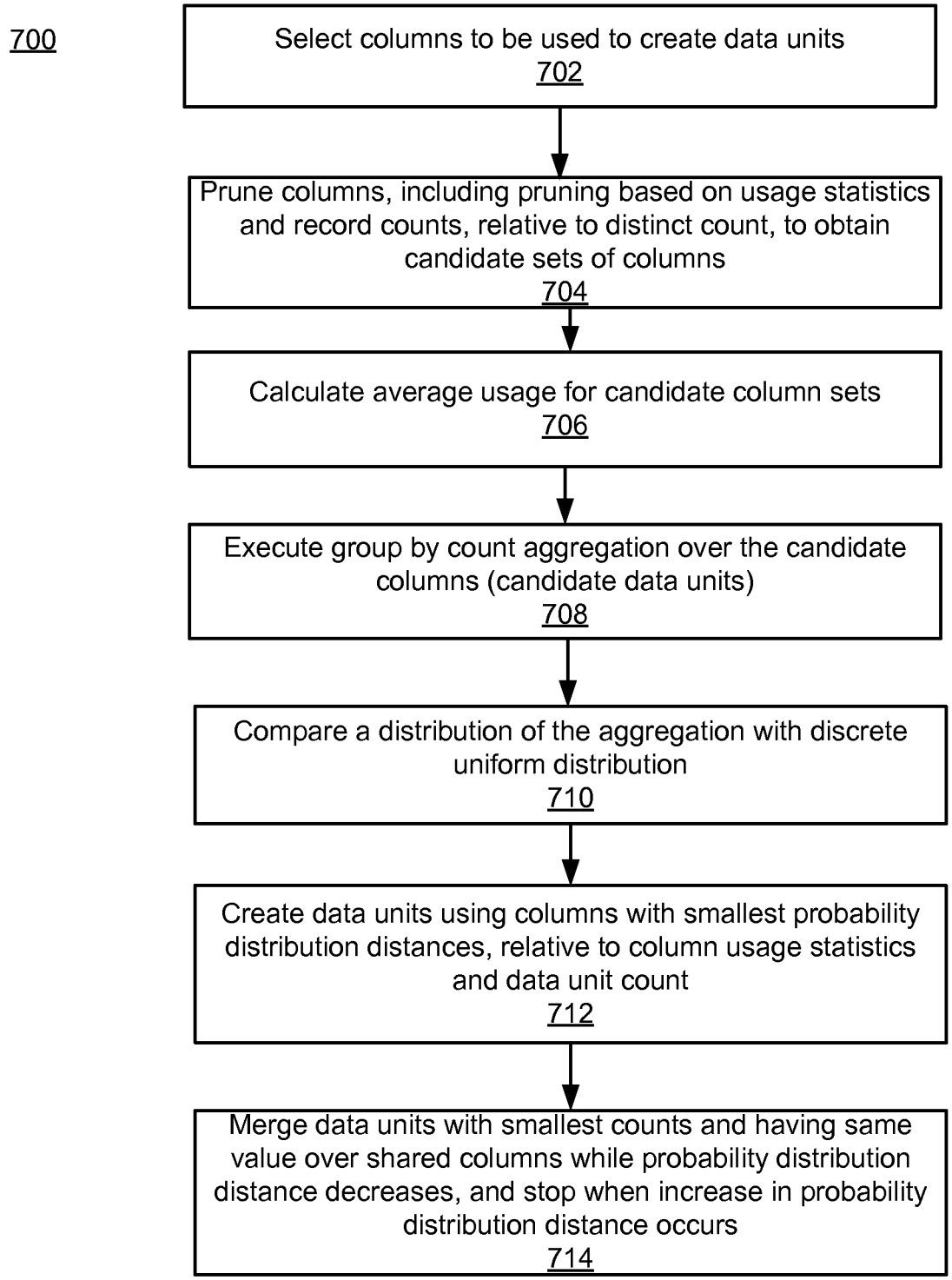
FIG. 7A is a flowchart illustrating example operations for generating data units using the system of FIG. 1.

With reference to FIG. 7A, in the flowchart 700, an algorithm for creating the type of small, granular dynamic data units described above is provided. In FIG. 7B, a simplified example table is provided for use in explaining operations of the data unit generator 122 in conjunction with the flowchart 700 of FIG. 7A. As shown in FIG. 7B, columns 720, 722, 724 are included, and have values defined by corresponding rows/records 726-744.

In the example of FIG. 7A, columns to be used to create data units are selected (702). That is, a set of columns $c_1$ to $c_n$ may be selected to create data units. For example, either individual columns, or a set of columns (e.g., all non-empty subsets of columns) may be used.

For example, in FIG. 7B, the column $c_1$ 720 having the attribute "product class" may be selected, so that records 726-734 having a column value of product class=I, and/or records 736-744 having a column value of product class=II may be selected as example bases for sets of data units. As may be observed, there are two distinct counts of different values (i.e., I and II) in the column 720, and a count of data records in these examples is 5 each, i.e., there are 5 total data records with the value I, and 5 total data records with the value II. In other examples, for the column $c_2$ 722, there are also two distinct counts of different values (i.e., "soap" and "shampoo"), with a count of 6 data records with a value of "soap" and a count of 4 data records with a value of "shampoo." For the column $c_3$ 724, there are 3 distinct values (i.e., "ABC," "DEF," and "GHI"), with respective counts of 4, 4, and 2.

As referenced above, data units may be generated for combinations (sets) of column values, as well. For example, for a combination of columns $c_1$, $c_2$ the distinct count is 4, with the count of (I, soap)=3, the second count of (I, shampoo)=2, the third count of (II, soap)=3, and the fourth count of (II, shampoo)=2. Of course, in other examples, a column set of $c_2$, $c_3$ and $c_1$, $c_3$ could also be selected, as described in more detail, below.

In contrast to the simplified example of FIG. 7B, large database tables will have large numbers of columns, and since possible combinations/sets of columns will grow exponentially with the additions of more columns, it may be desirable to prune columns and column sets before initiating actual generation of possible data units (704). For example, if a possible number of column(s) exceeds a threshold T, then pruning may be implemented. In other implementations, at least some types of pruning may always be implemented, while additional pruning may be dependent on the value of T and a number of possible columns.

In some implementations, for example, a column or set of columns which forms a super key may be removed. That is, it may be generally undesirable to select a key or super key as the data unit, since by definition such columns identify a data record uniquely and thus do not add value in terms of defining data units that will be useful for partitioning, column management, and hot/warm data identification. In other words, for example, it may be possible to avoid large numbers of partitioning units (e.g., one for each row, and thereby avoid a high level of complexity). This condition may be ignored, if desired and appropriate, such as in scenarios in which, for example, all elements of a power set of columns are super keys.

As also referenced in FIG. 7, column pruning may be executed based on one or more other factors, such as, for example, usage statistics associated with the column(s) in question, or the distinct count of values within the column(s) in question, perhaps relative to a total count of records associated with the column(s) in question. Conceptually, such pruning may reflect the fact that columns with high usage counts (i.e., columns frequently and/or recently used by the queries 110) may be more valuable with respect to current and future queries if used to form data units. Usage information, it will be appreciated, may be obtained, e.g., from the query log 118 and/or the column-based usage table 128.

Somewhat similarly to the exclusion of columns that are keys/super keys for the table in question, columns with relatively low record counts may also be pruned. That is, just as it may be undesirable to include a column defining a super key that uniquely identifies a single data record, it may be undesirable to include a column uniquely defining a pair, or triplet, or other low number of data records.

In some example implementations, pruning may occur based on a combination of usage counts and total record count, relative to a distinct value count. In other words, columns having a high distinct value count may be discounted for similar reasons as just set forth, i.e., the generation of data units that are too small to be of practical use. Thus, for example, Function 1 provides an example calculation for evaluating column(s) relative to a threshold T for possible pruning from further data unit generation operations:

$$\frac{\text{usage}(c_i) * \text{recordCount}(c_i)}{\text{distinctCount}(c_i)} \quad \text{Function 1}$$

Again, in the example of Function 1, high usage counts and high record counts for a given column(s) will tend toward inclusion of the column(s) in question when generating data units, while high distinct value counts will tend toward exclusion. While Function 1 conveniently combines all three of these factors, it will be appreciated that the various factors, and other factors, may be used alone and/or in different combinations.

After column pruning occurs, candidate column sets are obtained, in which each candidate column set may be referred to as "C," and an average usage of the column(s) in the candidate column sets may be calculated (706). In other words, the value of usage ($c_i$) will generally vary for each column set "C," and these values may be averaged to obtain the average usage value for the candidate column sets as a whole.

Then, a group by count aggregation may be executed over the candidate columns (708). In other words, the dynamic data unit generator 122 may proceed to count a frequency of the dictionary based on the columns. This effectively generates candidate data units, where the number of groups is equal to the count of candidate data units. For example, for the table of FIG. 7B, and as should be apparent from the discussion above, grouping by count for column $c_1$ would give {5, 5}, for column $c_2$ would give {6, 4}, for column $c_3$ would give {4, 4, 2}, for columns $c_1$, $c_2$ would give {3, 2, 3, 2}, for columns $c_2$, $c_3$ would give {2, 2, 2, 2, 2}, and for columns $c_1$, $c_3$ would give {2, 2, 1, 2, 2, 1}.

A distribution of the aggregation may be compared with a discrete uniform distribution (710). For example, the frequency count distribution may be compared with a discrete uniform distribution having a parameter equal to the number of groups, and using a probability distribution distance, such as the Bhattacharya distance. In additional or alternative examples, the variance of the frequency distribution may be calculated for each candidate column set, using the previously-calculated average usage counts (thus providing a specialized example of a probability distribution relative to the uniform distribution). Conceptually, with reference to the candidate data units just described, operation 710 finds data units that are of uniform size, or are close to uniform size. For example, the candidate data unit for $c_1$ has a uniform size of 5, while the candidate data unit for $c_2$, $c_3$ a uniform size of 2. In other words, these candidate data units have a probability distribution distance of zero. On the other hand, the remaining candidate data units all have non-uniform distributions, and the operation 710 may thus be understood to find either uniform data units and/or data units of candidate data units have the smallest probability distribution distance from the uniform distribution, where, as referenced, multiple known techniques exist for quantifying a uniformity (or lack thereof) of candidate data units, relative to one another.

Data units may then be selected using columns having a smallest probability distribution distance, relative to other relevant factors, such as column usage statistics and a number of data units that would result (data unit count) (712). Expressed mathematically, for example, C* represents a selected column set representing a selected data unit from the candidate data units, obtained as an optimization problem which is solved using Equation 1:

$$C^* = \operatorname{argmax}_{c \subset C, c \not\supseteq key} \frac{(E[\text{Usage}(c)] + 1) * DUCount(c)}{(d(F(c), U) + 1)} \quad \text{Equation 1}$$

In Equation 1, "key" represents the set of all super keys, E[Usage(c)] is the average usage of the columns as referenced above, DUCount(c) is the count of the candidate data unit(s), d is the probability distribution distance, F (c) is the frequency count of the value of the columns in the column c, and U is the discrete uniform distribution. In Equation 1, the constant term 1 is added in the denominator for normalization, i.e., to avoid a zero denominator when the probability distribution distance is zero (e.g., uniform distribution).

When using Equation 1 with the simplified example of FIG. 7B, the candidate data units might be $c_1$ and {$c_2$, $c_3$}, due to their relative uniformity of distribution in the sense described above, and assuming comparable usages for the sake of the example. Because the data unit count would be higher for {$c_2$, $c_3$} (i.e., 5 data units as compared to 2}, {$c_2$, $c_3$} may be selected, thereby providing data units of $D_1$ [Soap, ABC], $D_2$ [Soap, DEF], $D_3$ [Soap, GHI], $D_4$ [Shampoo, ABC], $D_5$ [Shampoo, DEF].

Finally in FIG. 7, data units having smallest counts and the same value over shared columns may be merged over shared columns as long as the probability distribution distance decreases, and/or until the probability distribution distance increases (714). In other words, given that data units have been defined initially based on the operations 702-712, such merging may continue as long as the probability distribution distance continues to decrease, and the merging may be stopped when the probability distribution distance starts to increase. For example, in the candidate data unit for {$c_1$, $c_3$}, a number of small data units are included that share column values (e.g., the column value of I or II, or a shared column value of one of the companies ABC, DEF, GHI), and it may be possible to merge data units based on these shared values as long as doing so maintains or decreases the probability distribution distance for the candidate data units as a whole.

Using this technique, a number of data units may be obtained that provides a good balance between a size of data units and a number of the data units, while providing sufficient granularity for implementation of the types of partition analysis, column management, and hot/warm data identification described herein, as well as for the associated execution of data movement within and among the in-memory database 106 and the disk-based database 108. Of course, additional or alternative implementations may be used, depending on a context of a given implementation.

For example, an additional optimization may be used for an orders table such as a time series table, in which serious data represents sensor values over a time period, with each series represented by a particular sensor. In such context, each record in a series is characterized by a series key, series period, and a value. For a time series table, it is possible to consider only the non-empty column subsets which contain the series key. This divides the series into smaller dynamic data units, giving a different or hierarchical level of granularity for time series data; i.e., partitions, series, and data units.

As referenced above, the data unit generator 122 is dynamic in the sense that data units are not fixed in size or number. Instead, the algorithm of FIG. 7A, or similar algorithm, is implemented automatically after a fixed number of m of online workloads, or when there is a batch insert or update that modifies the dictionaries of the columns, and, as described above with respect to FIGS. 5 and 6, triggers a redefinition of data units.

Figure 8:
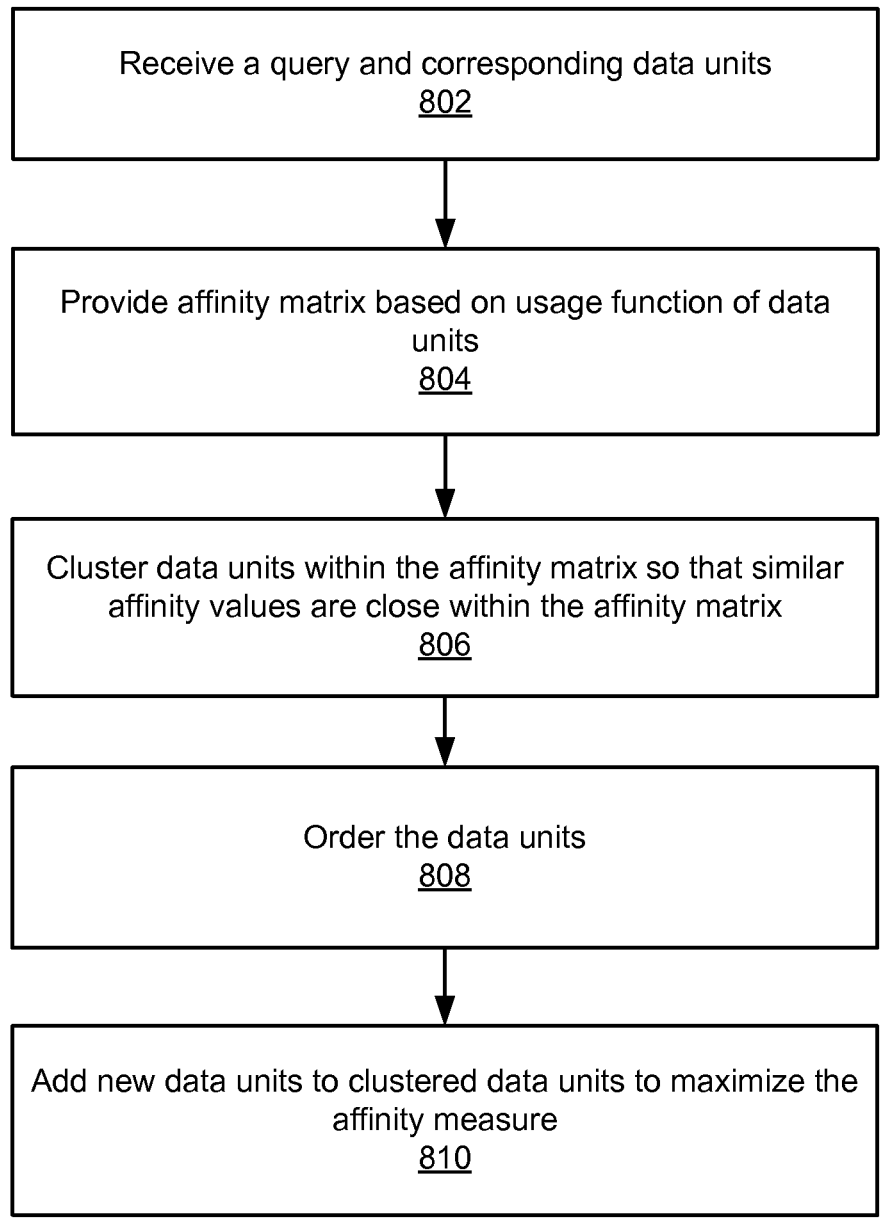
FIG. 8 is a flowchart illustrating example operations for clustering the generated data units of FIGS. 1 and 7.

FIG. 8 is a flowchart 800 illustrating more detailed example operations of the data unit cluster generator 130 of FIG. 1. As described above, the use of dynamic units and clusters of dynamic data units facilitates unification of automated partition analysis, data temperature management, and column management, based on query access patterns. In other words, characterizations of queries and predictions of future queries and types of queries may provide a basis for defining data units and data unit clusters in a way that helps ensure that data stored in the in-memory database 106 will be available and accessible in response to receipt of current and future queries.

In this regard, a usage function U ($q_{t_k}$, $u_i$) helps determine whether a given query is frequently received, or otherwise imported or valuable with respect to defining data units and clusters of data units. In other words, the usage function can be used to denote whether or not a given query, at a given time $t_k$, references a particular dynamic data unit $u_i$. Thus, an example of such a usage function may be expressed as an Equation 2:

$$U(q_{t_k}, u_i) = \begin{cases} 1, & \text{if } q_{t_k} \text{ references } u_i \\ 0, & \text{otherwise} \end{cases} \qquad \text{Equation 2}$$

The usage function of Equation 2 also may be extended. For example, the usage function may be extended to incorporate query weights assigned to individual queries, explicitly reflecting relative importance levels for relative frequencies of the queries being characterized.

Meanwhile, Equation 3 is used to represent an affinity function $A(u_i, u_j)$ that measures an affinity between two data units $u_i, u_j$, for purposes of generating data unit clusters. More specifically, the affinity function may be used to count co-occurrences of the data unit $u_i, u_j$ within the query window in question, using the usage function of Equation 2, as shown in Equation 3:

$$A(u_i, u_j) = \sum_{q \in W_{t_k}^N} U(q, u_i) \cdot U(q, u_j) \qquad \text{Equation 3}$$

The affinity function of Equation 3 produces a 2D matrix between every pair of dynamic data units. The affinities of the data units, as referenced above, also may be used to generate data unit clusters. Through the use of data unit clusters as described herein, is not necessary to move each record or data unit, but instead, a cluster of data units may be moved between the two memories 106, 108, or between two partitions (during a partitioning or re-partitioning analysis). Then, using the techniques of FIG. 8, it is possible to cluster the affinity matrix such that the cells of the affinity matrix having similar affinity values are placed close together within the affinity matrix, thereby providing a new ordering of data units, where the data unit order is represented as ($\preceq_D$).

In other words, a data unit ordering ($\preceq_D$) defines an order on the dynamic data unit in a data unit set $D_u$. Then, an affinity measure on the data unit ordering, $M((\preceq_D))$, as described in detail below, may be used to measure a quality of an affinity clustering, using Equation 4:

$$M(\preceq_D) = \sum_{i=1}^{n} \sum_{j=1}^{n} A(u_i, u_j)(A(u_i, u_{j-1}) + A(u_i, u_{j+1})) \qquad \text{Equation 4}$$
$$= \sum_{j=1}^{n} (P^2[u_j][u_{j-1}] + P^2[u_j][u_{j+1}])$$

Thus, it may be observed that an objective of the affinity matrix clustering problem is to maximize the affinity measure of Equation 4. For example, in an example technique using a greedy algorithm, one approach is to take each data unit individually, and add each individual data unit to the already clustered data units incrementally, such that a contribution of the added data unit to the current affinity measure is maximized at each step.

In this regard, a contribution to the affinity measure of a new data unit $u_k$, when placed between two already placed attributes (dynamic data units) $u_i, u_j$ is shown in Equation 5:

$$Cont(u_i, u_j, u_k) = \qquad \text{Equation 5}$$
$$2\sum_{z=1}^{n} [A(u_z, u_i) \cdot A(u_z, u_k) + A(u_z, u_k) \cdot A(u_z, u_j) -$$
$$A(u_z, u_i) \cdot A(u_z, u_j)] =$$
$$2(P^2[u_i][u_j] + P^2[u_j][u_k] - P^2[u_i][u_k])$$

In many implementations of the system 100 of FIG. 1, such as in online settings, a time available to execute partition analysis, column management, and identification of hot/warm data may be relatively limited. In such scenarios, the algorithms of FIGS. 7-8 (and FIGS. 9-10, discussed below) help to minimize the workload of the unified data manager 102, so as to have minimal impact on query processing while partitioning and hot/warm data identification occurs. Particularly, for example, the analysis required for calculating partitions in hot/warm data identification may be done dynamically after every query, as described above with respect to FIG. 6. Accordingly, the data unit cluster generator 130 may be configured to re-cluster the affinity matrix after each incoming query, and based on the update to the affinity matrix. Affinity matrix clustering algorithms described herein is dynamic, and does not need to re-compute all affinity values after each query, nor re-cluster the partitioning units from scratch. Instead, the data unit cluster generator 130 may be configured to compute all relevant affinities once, and then for each incoming query, update only the affinities between referenced partitioning units. The change in each of these affinity values will be one, due to co-occurrence of the changes in the incoming query being evaluated.

For example, for a sample query SELECT $p_1, p_2 \ldots$ FROM table WHERE=$v_1=v_1$ & $v_2=v_2 \ldots$, the resulting update on the affinity matrix will include an increase in the value of the affinity matrix cell $A(u_i, u_j)$ by one for all data units $u_i$ and $u_j$ represent a query. Considering the previous data unit example [1100 . . . 0] from the discussion of dynamic data unit generation, where, as described, all the data units are represented as [Value ($c_1$), Value ($c_2$)], the increase will be in cell A([Value($c_i$)=c1, Value($c_2$)=$c_2$], [Value($c_1$)=c1, Value($c_2$)=c2]). On the other hand, if the sample query has been executing selection over a single column, e.g., $c_1=v_1$, then the corresponding increase would be in all cells of form A([Value($c_1$)=$v_1$, Value($c_2$)], [Value ($c_1$)=$v_1$, Value($c_2$)]) for the same data unit.

In the example of FIG. 8, and in the example data unit clustering algorithm provided below, only data units referenced by an incoming query are considered for rearrangement, since only such data units could have made any change in their affinities. In the example algorithm, a first data unit referenced in the incoming query is kept at its original decision, while for the $i^{th}$ reference unit, the left and right positions of the (i−1) reference units that have already been placed are considered. Then, the position that offers maximum contribution to the global affinity measure is chosen, and the process continues until all reference data units are placed.

Thus, in the example of FIG. 8, a query is received and corresponding, referenced data units are identified (802). An additional affinity matrix may be provided, based on a corresponding usage function of data units, such as the usage function provided above (804).

Data units may then be clustered within the affinity matrix, such that similar affinity values are close to one another within the affinity matrix (806). The data units may then be ordered, based on affinity values (808). Finally in FIG. 8, new data units may be added to cluster data units in a manner which maximizes the affinity measure (810). As referenced above, and illustrated in the example data clustering algorithm below, operations of FIG. 8 may be executed iteratively until all data units have been clustered, whereupon corresponding clustering operations may be undertaken for the next-received query in the same manner.

The data unit clustering algorithm below provides additional sample details for implementation of the flowchart 800 of FIG. 8:

Require:
$\preceq'_D, \preceq_D, i$

---
Algorithm 1
---

Ensure:
    Clustered one dimensional data unit vector
    DataUnit newDataUnit = GetDataUnit($\preceq_D$, i)
    if i == 1 then
        PutDataUnit($\preceq'_D$, newDataUnit, 1)
        CLUSTER($\preceq'_D, \preceq_D$, i+1 )
    else
        contribution = 0
        position = 0
        for k=1 to i do
            DataUnit leftDataUnit = GetDataUnit($\preceq'_D$, k−1 )
            DataUnit rightDataUnit = GetDataUnit($\preceq'_D$, k+1 )
            contribution' = Cont(leftDataUnit, currDataUnit, newUnit)
            if contribution' > contribution then
                contribution = contribution'
                position = k
            end
        end
        PutDataUnit($\preceq'_D$, newDataUnit, position)
        if i < SizeOf($\preceq_D$) then
            CLUSTER($\preceq'_D, \preceq_D$, , i+1 )
        end
    end

---

With respect to partitioning, the partition analyzer 134 implements partitioning as a reordering, clustering, and splitting problem. The partition splits are based on the query window snapshot after the ordering and clustering operations of the data unit cluster generator 130, as described above.

In the following, a split vector S is a row vector of (n−1) split lines in data unit ordering $\preceq_D$), where a split line sj is defined between partitioning units uj and uj+1 as shown in Definition 2:

$$s_j = \begin{cases} 1, & \text{if there is split between } u_j \text{ and } u_{j+1} \\ 0, & \text{for no split} \end{cases} \quad \text{Definition 2}$$

Then, a partition $p_{m,r}(S, \preceq_D)$ is a maximal chunk of adjacent partitioning units from $u_m$ to $u_r$ such that split lines $s_m$ to $S_{r-1}$ are all 0.

The partition analyzer 134 analyzes partitions based on incoming queries added to the workload. This involves snapshotting the query window, enumerating and analyzing the partitioning candidates, and emitting the best partitioning as output.

In the brute force approach, all possible values (0 or 1) can be considered for a split vector S. Each such split vector is representative of the candidate partitioning scheme. The split vector is chosen for which the cost of workload execution $C_{est}(W, S)$ is minimum, which can be calculated by the query execution plans based on CPU time, reads and writes. Algorithm 2, below, is an example for partitioning in an online setting. In the example, instead of enumerating over all possible split line combinations, the algorithm greedily sets the best possible split line, one at a time.

Require:
    S, left, right, PrevPartitions

---
Algorithm 2
---

Ensure:
    Enumerate over possible split vectors
    SplitLine sLeft = BestSplitLine (S, left)
    Cost minCostLeft = BestSplitLineCost(S,left)
    SplitLine sRight = BestSplitLine(S,right)
    minCostRight = BestSplitLineCost(S,right)
    SplitLine sPrev = BestSplitLine(S, PrevPartitions)
    Cost minCostPrev = BestSplitLineCost(S, PrevPartitions)
    if invalid(sLeft) and invalid(sRight) and invalid(sPrev) then
        return
    end
    Cost minCost = min(minCostLeft, minCostRight, minCostPrev)
    if minCost == minCostLeft then
        SetSplitLine(S, sLeft)
        if sRight > 0 then
            AddPartition(right, sRight, minCostRight)
        end
        right = sLeft+1
    else if minCost ==minCostRight then
        SetSpiltLine(S, sRight)
        if sLeft > 0 then then
            AddPartition(left, sLeft, minCostLeft)
        end
        left = right
        right = sRight+1
    else
        SetSplitLine(S, sPrev)
        if sRight > 0 then
            AddPartition(right, sRight, minCostRight)
        end
        if sLeft > 0 then
            AddPartition(left, sLeft, minCostLeft)
        end
        RemovePartition(sPrev)
        left = pPrev.start( )
        right = sPrev+1
    end
    dynamicEnumerate(S, left, right, PrevPartitions)

---

Algorithm 2 starts with a split vector having all split lines set to 0 and at each iteration it sets (to 1) only one split line. To determine which split line to set, the Algorithm 2 considers all split lines unset so far, and picks the one giving the lowest workload execution cost. First, Algorithm 2 finds the best split line and its corresponding cost in: the left and right parts of the last partition, and all previous partitions. If no valid split line is found then the algorithm returns. Otherwise, the algorithm compares these three split lines, chooses the one having lowest costs, and repeats the process. Given the partitioning scheme P', the partition analyzer 134 also decides whether or not to transform the current partitioning scheme from P to P' based on a cost-benefit analysis model.

With respect to hot and warm data identification by the temperature selector 136, hot and warm data stores can be considered as 2-layered horizontal partitions, and the temperature of the data units can be identified based on query access. Then, the data can be partitioned into hot and warm stores. For example, it may occur that several data units are almost never referenced by any of the queries in the query window. Due to the one-dimensional clustering algorithm used by the data unit cluster generator 130, such data units are expected to be in the beginning or the end of the data unit ordering after clustering. Therefore, the temperature selector 136 prunes them into a warm store right away by finding the two split lines as 1 at both ends of the cluster after execution of Algorithm 2. The data units ending up in the hot store are then partitioned based on the remaining split lines. As an example, the following split lines may be determined: [010101001] for 10 data units after clustering, ordering and execution of Algorithm 2. Thus, data units $u_1$; $u_2$; $u_{10}$ will lie in warm store, while remaining data units $u_3$; $u_4$; $u_5$; $u_6$; $u_7$; $u_8$; $u_9$ will lie in hot store and be partitioned into three partitions as $[u_3; u_4]$; $[u_5; u_6]$; $[u_7; u_8; u_9]$, according to the remaining split lines.

Figure 9:
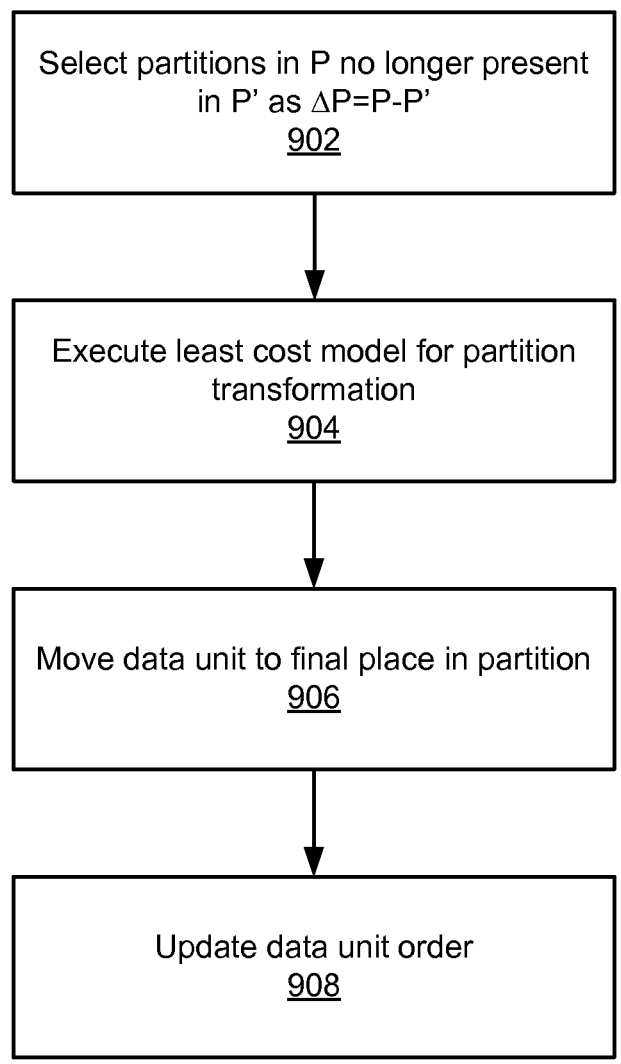
FIG. 9 is a flowchart illustrating example operations for partitioning data using the system of FIG. 1 and the generated, clustered data units of FIGS. 7 and 8.

FIG. 9 is a flowchart illustrating more detailed example operations of the data unit swapper 138 of FIG. 1. The data unit swapper 138 optimizes the transformation suggested by the new partitioning and data temperature scheme by finding the partitions in P which are no longer present in P': ΔP=P−P' (902), and providing a least cost model for transformation with lowest shuffling of data units (904). In this way, each data unit may be moved to a final place within the new partition P', and the data unit order ($\precsim_D$) may be updated accordingly. A more detailed example of FIG. 9 is provided using the example of Algorithm 3, below:

---
Algorithm 3
---
Require:
   vector containing metadata of data units, vU
   ordering vector from clustering algorithm, vOrder
   split vector from O²P algorithm, vS
Ensure:
   assert(vU.size( ) == vOrder.size( ) == vS.size( ));
   ΔP = P − P'
   for u ∈ (ΔP∩ vU) do    ▷ For all elements to put in place
     while u != vOrder[u] do▷ While the data unit u is not yet in correct partition
       alt = vOrder[u];
       prevPartitionNumberU = P[u]
       newPartitionNumberU = Σ$_o^u$ vS
       uRep = vU[alt]
       newPartitionNumberURep = Σ$_o^{uRep}$ vS
       if newPartitionNumberURep == prevPartitionNumberU then
         swap( vU[u], vU[alt]);
       else
         place( vU[u], alt, partitionNumber);
                                 ▷ Move it to its final place
       swap( vOrder[i], vOrder[alt] );   ▷ Maintain order vector
---

As described above, transformation costs are minimized and the database (or even single tables) are not stalled, e.g., by incoming queries. In example implementations, a table or horizontal partition may be transformed in the background, so that P is transformed to P' and all incoming queries are routed to P. Once the transformation is finished, queries can be atomically switched to P'. For updates, this process can be enriched by keeping a delta file or log of the updates that are arriving, while the transformation is running. Any incoming query may then be computed by considering P and L. If the transformation is finished, P' is merged with P.

With respect to the column manager 126, as already described, while memory consumption is important, it is also important to ensure a high hit ratio of the data being demanded by the queries 110. The column manager 126 may store the column-based usage table 128 T(C), using a similar usage function U ($q_{t_k}$, $c_i$) as described above, whether or not a query $q_{t_k}$ at time $t_k$ references column $c_i$, which is used by the column manager 126 to offload columns, when memory in the in-memory columnar database 104 is almost full (e.g., 95% full).

In a specific query example, a query may include SELECT p1; p2; ::: FROM table WHERE ci=vi. Then only the $T(c_i)$ is increased by 1, while similarly for selections on more columns, the corresponding table entries will be increased. For the example, and as outlined with respect to FIG. 10, the column manager 126 may use an algorithm using adaptive replacement that keeps a track of both frequently used and recently used columns, along with history data regarding eviction for both.

The algorithm uses two least-recently used (LRU) lists, referred to as L1 and L2, based on the column usage table 128. The list L1 contains all the columns that have been accessed exactly once in the query workload, while the list L2 contains the columns that have been accessed at least twice in the query workload. Thus L1 can be thought of as capturing short-term utility (recency), and L2 can be thought of as capturing long term utility (frequency).

Each of these lists is split into top memory entries and bottom ghost entries. The ghost lists keep a track of recently evicted columns from memory, and help in adapting the behavior of the algorithm. In the example implementations, the ghost lists contain only the meta-data and not the actual columns. Also in the example, L1 is split into T1 and B1, and L2 is split into T2 and B2. The entries in the union of T1 and T2 constitute the memory, while B1 and B2 are the ghost lists.

The memory directory is thus organized into four LRU lists: T1, for recent memory entries; T2, for frequent entries, referenced at least twice; B1, ghost entries recently evicted from the T1 list but that are still tracked; and B2, similar ghost entries, but evicted from T2. If the memory size is c, then |T1+T2|=c. If |T1|=p, then |T2|=(c−p).

The algorithm continually adapts the value of parameter p depending on whether the current workload favors recency or frequency. If recency is more prominent in the current workload, p increases; while if frequency is more prominent, p decreases (that is, (c−p) increases). Also, the size of the memory directory can be expressed as |L1|+|L2|=2c.

Figure 10:
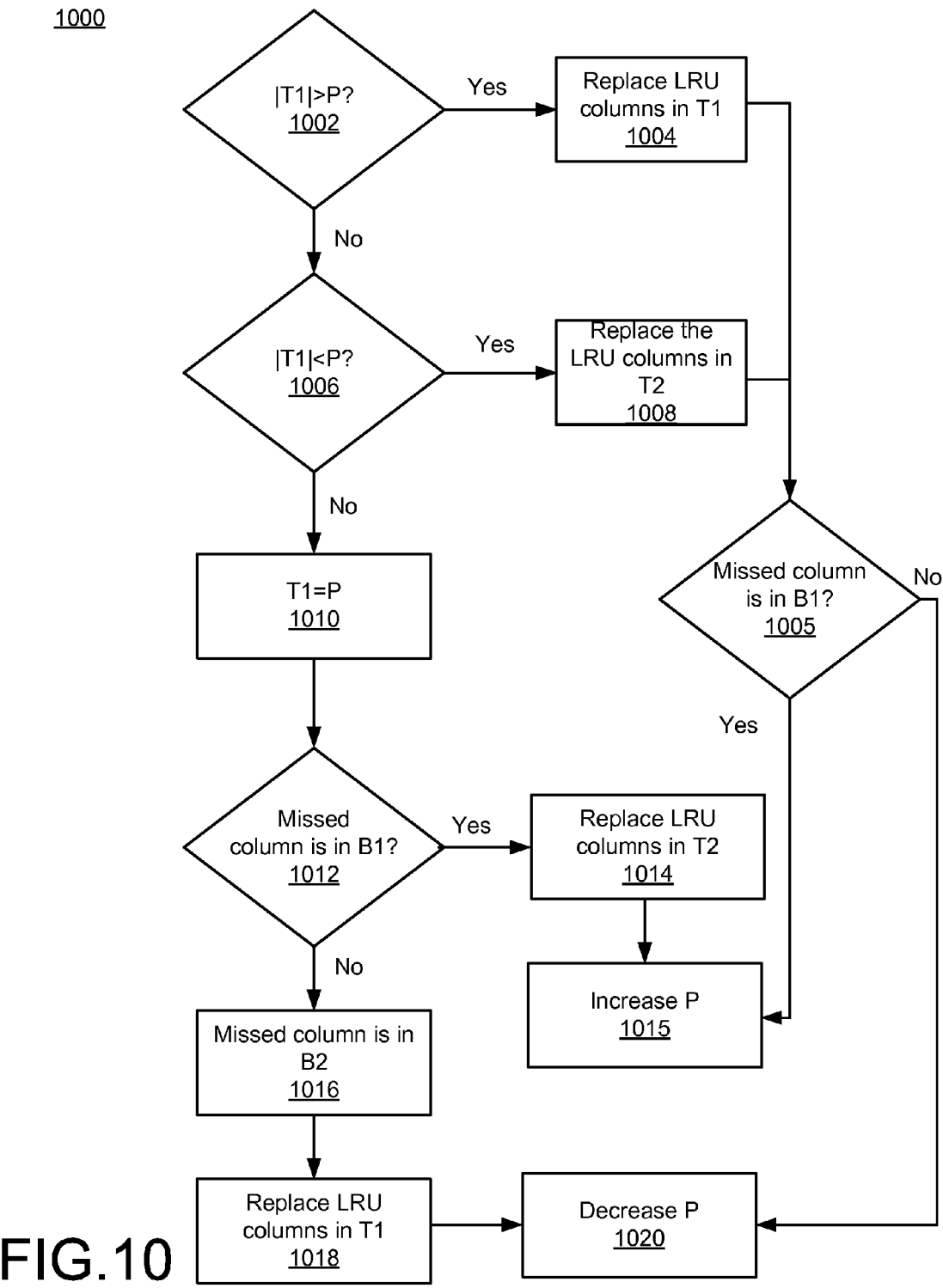
FIG. 10 is a flowchart illustrating example operations for column management for columns of data within the in-memory database of the system of FIG. 1.

For a fixed p, the algorithm for replacement would be as shown in FIG. 10. Specifically, if |T1|>p (1002), the LRU columns in T1 are replaced (1004). If the missed column is in B1, then P is increased (1015). Otherwise, if the missed column is not in B1, then P is decreased (1020).

If |T1|<p (1006), the LRU columns in T2 are replaced (1008). Then, again, if the missed column is in B1, then P is increased (1015). Otherwise, if the missed column is not in B1, then P is decreased (1020).

If |T1|=p (1010) and the missed column is in B1 (1012), the LRU columns in T2 are replaced (1014). Otherwise, if |T1|=p and the missed column is in B2 (1016), the LRU columns in T1 are replaced (1018).

In various implementations, instead of replacing one column, multiple columns may be replaced, in order to free the memory such that free space is sufficient to load the requested column. The adaptation of the value of p is based on the idea that if there is a hit in B1, then the data stored from the point of view of recency has been useful, and more space should be allotted to store the least recently used one time data. Thus, it may be desirable to increase the size of T1 for which the value of p should increase. If there is a hit in B2 then the data stored from the point of view of frequency was more relevant, and more space should be allotted to T2. Thus, the value of p should decrease. The amount by which p should deviate can be defined by the relative sizes of B1 and B2.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed, are configured to cause at least one computing device to:

receive a stream of queries to be applied against data in a columnar-store database in which hot data is stored in an in-memory database for preferred access relative to warm data stored in a disk-based database;

track usage counts for columns of the columnar-store database, reflecting usage thereof by individual queries of the stream of queries;

select column sets, each column set including at least one column of the columnar-store database;

calculate, for each column set, at least one record count of data records that include a column value, and at least one distinct count of distinct column values within each column set;

generate at least one dynamic data unit from the column sets, based on the usage counts, the at least one record count, and the at least one distinct count, the at least one dynamic data unit including a set of data records sharing at least one common column value;

analyze partitions of the data, based on the at least one dynamic data unit, to thereby obtain updated partitions;

identify updated hot data and updated warm data within the updated partitions, based on the at least one dynamic data unit; and execute a data swap of data units from the partitions to the updated partitions, using the at least one dynamic data unit, to thereby have the updated hot data positioned within the in-memory database and the updated warm data within the disk-based database.

2. The computer program product of claim 1, wherein the instructions, when executed, are further configured to cause the at least one computing device to:

process a current query of the stream of queries, including loading related columns from a disk memory of the in-memory database to a main memory of the in-memory database, and evicting under-used columns from the main memory of the in-memory database to the disk memory of the in-memory database, based on a fullness level of the main memory of the in-memory database, wherein the loading and the evicting are performed using the at least one dynamic data unit.

3. The computer program product of claim 1, wherein the at least one dynamic data unit is represented as a pair of vectors, including a first vector that is a Boolean vector $[b_0, b_1, \ldots, b_{|C|}]$, and a second vector of column values $[v_0, v_1, \ldots, v_{|C|}]$, wherein C is the column sets, $|C|$ is the cardinality of C, $b_i$ are indicator functions indicating which columns are used, and $v_i$ are values of the columns used.

4. The computer program product of claim 1, wherein the generation of the at least one dynamic data unit is conducted in response to one or both of a workload count received from a workload counter indicating that a workload threshold of queries has been met, and a detection of a data insert or update of the data.

5. The computer program product of claim 1, wherein the instructions, when executed, are further configured to cause the at least one processor to monitor a window of queries of the stream of queries, thereby defining a sliding query window of fixed checkpoint size, and to slide the query window upon detection of a reaching of a maximum size by the query window.

6. The computer program product of claim 5, wherein the partition analysis is conducted in response to a detection that the query window maximum size has been reached.

7. The computer program product of claim 1, wherein the partition analysis is conducted in response to a detection that a performance of the in-memory database in processing a current query has degraded to a threshold.

8. The computer program product of claim 1, wherein the at least one dynamic data unit includes a plurality of dynamic data units, and wherein the instructions, when executed, are further configured to generate a cluster of a set of the plurality of dynamic data units, for movement of the cluster between the in-memory database and the disk-based database, or between a partition and updated partition.

9. The computer program produce of claim 8, wherein the cluster is defined using an affinity matrix linking query usage of pairs of the at least one dynamic data unit, based on co-occurrence of each pair within a query window of the stream of queries.

10. The computer program product of claim 1, wherein the data swap is executed by finding partitions no longer present in the updated partitions, and providing a least cost model for swapping data units to minimize shuffling of data units during the data swap.

11. A computer-implemented method for executing instructions stored on a non-transitory computer readable storage medium, the method comprising:
   receiving a stream of queries to be applied against data in a columnar-store database in which hot data is stored in an in-memory database for preferred access relative to warm data stored in a disk-based database;
   identifying a dynamic data unit generation trigger from the stream of queries;
   identifying sets of columns of the columnar-store database;
   identifying, for each column set of the sets of columns, at least one record count of data records including a column value, and at least one distinct count of distinct column values;
   calculating a relative probability distribution distance for each column set of the sets of columns, based on the at least one record count and the at least one distinct count;
   generating at least one dynamic data unit from at least one column set of the sets of columns, based on the at least one record count, the at least one distinct count, and the relative probability distribution distances; and
   partitioning the data, and identifying updated hot data and updated warm data therein, based on the at least one dynamic data unit.

12. The method of claim 11, wherein the identifying sets of columns includes pruning available column sets based on one or more of: usage counts of columns used to satisfy the queries, the at least one record count, and the at least one distinct count.

13. The method of claim 11, wherein the dynamic data unit trigger includes one or more of: a workload count received from a workload counter indicating that a workload threshold of queries has been met, and a detection of a data insert or update of the data.

14. The method of claim 11, comprising:
   monitoring a window of queries of the stream of queries, thereby defining a sliding query window of fixed checkpoint size; and
   sliding the query window upon detection of a reaching of a maximum size by the query window.

15. The method of claim 14, wherein the partitioning is initiated in response to one or more of: a detection that the query window maximum size has been reached, and a detection that a performance of the in-memory database in processing a current query has degraded to a threshold.

16. A system including instructions recorded on a non-transitory computer-readable storage medium, and executable by at least one processor, the system comprising:
   a query window monitor configured to cause the at least one processor to count queries of a stream of queries to be applied against data in a columnar-store database in which hot data is stored in an in-memory database for preferred access relative to warm data stored in a disk-based database, wherein the in-memory database includes a main memory and a disk-based memory configured to store the hot data, and wherein the query window monitor is further configured to count the queries relative to at least one sliding query window, and to count the at least one query window relative to a query workload;
   a data unit generator configured to cause the at least one processor to generate, in response to the at least one query window being full, at least one dynamic data unit including a set of data records sharing at least one common column value for a corresponding column set;
   a partition analyzer configured to cause the at least one processor, in response to a determination that the query workload is full, to analyze partitions of the data defined in terms of the data unit, to thereby obtain updated partitions;
   a temperature selector configured to cause the at least one processor to identify updated hot data and updated warm data within the updated partitions; and
   a data unit swapper configured to cause the at least one processor to execute a data swap of data units from the partitions to the updated partitions.

17. The system of claim 16, wherein the data unit generator is further configured to cause the at least one processor to generate the at least one dynamic data unit, including:
   identifying sets of columns of the columnar-store database;
   identifying, for each column set of the sets of columns, at least one record count of data records including a column value, and at least one distinct count of distinct column values; and
   calculating a probability distribution distance for each column set of the sets of columns, relative to a uniform distribution, based on the at least one record count and the at least one distinct count.

18. The system of claim 17, wherein the identifying sets of columns includes pruning available column sets based on one or more of: usage counts of columns used to satisfy the queries, the at least one record count, and the at least one distinct count.

19. The system of claim 16, further comprising a column manager configured to cause the at least one processor to process a current query of the stream of queries, including loading related columns from the disk memory of the in-memory database to the main memory of the in-memory database, and evicting under-used columns from the main memory of the in-memory database to the disk memory of the in-memory database, based on a fullness level of the main memory of the in-memory database, wherein the loading and the evicting are performed using the at least one dynamic data unit.

20. The system of claim 16, wherein the data unit swapper is further configured to cause the at least one processor to execute the data swap, including:
   finding partitions no longer present in the updated partitions; and
   providing a least cost model for swapping data units to minimize shuffling of data units during the data swap.

* * * * *